US008078206B2

(12) United States Patent
Chang

(10) Patent No.: US 8,078,206 B2
(45) Date of Patent: Dec. 13, 2011

(54) MOBILE PHONE AND METHOD FOR MANAGING SHORT MESSAGES OF THE MOBILE PHONE

(75) Inventor: Chia-Wen Chang, Taipei County (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 254 days.

(21) Appl. No.: 12/477,910

(22) Filed: Jun. 4, 2009

(65) Prior Publication Data

US 2010/0022260 A1 Jan. 28, 2010

(30) Foreign Application Priority Data

Jul. 28, 2008 (CN) .......................... 2008 1 0303125

(51) Int. Cl.
*H04W 4/00* (2009.01)
(52) U.S. Cl. ..................... 455/466; 455/403; 455/412.1; 455/412.2
(58) Field of Classification Search .................. 455/466, 455/403, 412.1, 412.2, 558, 566
See application file for complete search history.

(56) References Cited

U.S. PATENT DOCUMENTS

2004/0224706 A1* 11/2004 Lorello et al. ................ 455/466
2008/0146286 A1* 6/2008 Byun et al. .................... 455/566

* cited by examiner

*Primary Examiner* — Kamran Afshar
*Assistant Examiner* — Manpreet Matharu
(74) *Attorney, Agent, or Firm* — Altis Law Group, Inc.

(57) ABSTRACT

A mobile phone and method for managing short messages of the mobile phone are provided. The method sets a schedule for managing the short messages stored in a storage device, reads a timestamp of a short message when the short message is received, and assigns a first weight value or a second weight value to the short message. The method further generates a message folder according to the timestamp, and classifies the short message into the message folder. In addition, the method checks whether the short message has the first weight value or the second weight value, and backups the short message to the storage device if the short message has the first weight value, or deletes the short message from the message folder if the short message has the second weight value.

16 Claims, 3 Drawing Sheets

| Schedule | |
|---|---|
| Monthly | ○ |
| Weekly | ● |
| Daily | ○ |

| Item management | |
|---|---|
| Classify | ● |
| Backup | ○ |
| Delete | ○ |

| Weight value | |
|---|---|
| Message 1 | First |
| Message 2 | First |
| Message 3 | Second |

| Message folder | |
|---|---|
| 200806 folder | |
| 200807 folder | |
| 200808 folder | |
| Classify | ● |

| Backup message | |
|---|---|
| Message 1 | First |
| Backup | ● |
| Delete | ○ |

| Delete message | |
|---|---|
| Message 3 | Second |
| Backup | ○ |
| Delete | ● |

MOBILE PHONE AND METHOD FOR MANAGING SHORT MESSAGES OF THE MOBILE PHONE

BACKGROUND

1. Technical Field

Embodiments of the present disclosure relate to providing short message services of mobile phones, and more particularly to a mobile phone and method for managing short messages of the mobile phone.

2. Description of related art

With the continuous development of wireless network technology, it has become common to use mobile communication devices, such as mobile phones or personal data assistants (PDA), which are capable of engaging in short message services. A mobile phone may receive a large number of short messages, which occupy a storage space of the mobile phone. Therefore, a user of a mobile phone should timely manage the short messages so as to use the storage space efficiently.

However, there are few available systems or tools that can provide simple and effective management of the short messages on the mobile phone. One reason for this is that the short messages are often user-determined, and cannot be backup or deleted automatically. Alternatively, a simple management system on the mobile phone can be implemented easily, but the management system is inefficient for managing the short messages, and requires either a larger storage space or removable media to store the short messages.

Therefore, there is an improved system and method for managing short messages of a mobile phone, to overcome the above-mentioned disadvantages.

BRIEF DESCRIPTION OF THE DRAWINGS

FIG. 3A-3F are schematic diagrams of one embodiment of user interfaces provided by the mobile phone of FIG. 1.

DETAILED DESCRIPTION

Figure 1:
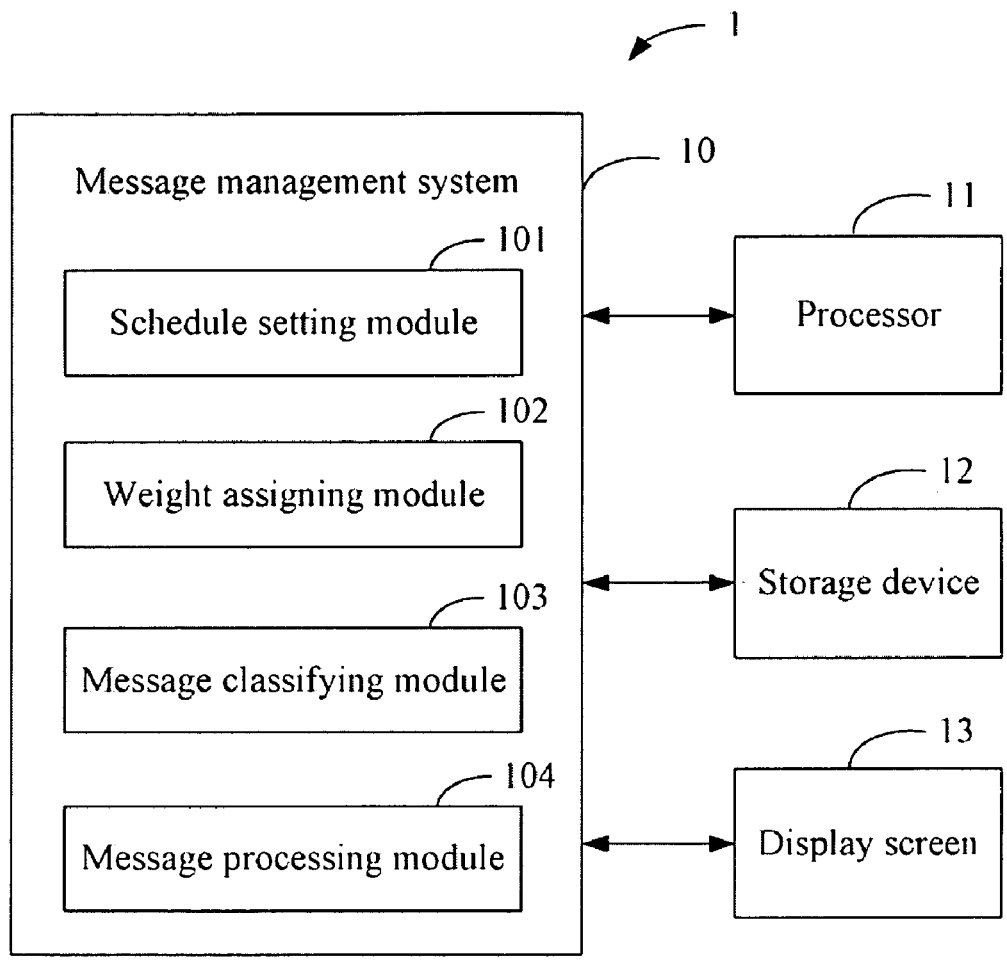
FIG. 1 is a schematic diagram of one embodiment of a mobile phone for managing short messages.

FIG. 1 is a schematic diagram of one embodiment of a mobile phone 1 for managing short messages. The mobile phone 1 includes a message management system 10, which is used to manage a large number of short messages received by the mobile phone 1. The mobile phone 1 may include at least one processor 11 that executes computerized codes for the short message management system 10, and may further include a storage device 12 and a display screen 13. In one embodiment, the message management system 10 is included in the storage device 12 or a computer readable medium of the mobile phone 1. In another embodiment, the message management system 10 may be included in an operating system of the mobile phone 1.

The storage device 12 stores a large number of short messages received by the mobile phone 1. In one embodiment, the storage device 12 may be a smart media card, a secure digital card, a compact flash card, a multi media card, or extreme digital card, and so on.

The display screen 13 is operable to display a plurality of user interfaces generated by the message management system 10 during the process of managing the short messages of the mobile phone 1. Referring to FIG. 3A-3F, the user interfaces may include a schedule management interface 31, an item management interface 32, a weight assigning interface 33, a message classifying interface 34, a message backup interface 35, and a message deleting interface 36, although the disclosure is not limited thereto.

In one embodiment, the message management system 10 may include a schedule setting module 101, a weight assigning module 102, a message classifying module 103, and a message processing module 104. Each of the function modules 101-104 may comprise one or more computerized operations that can be executed by the at least one processor 11 of the mobile phone 1.

The schedule setting module 101 is operable to generate and display a schedule management interface 31 on the display screen 13, and receive a schedule from the schedule management interface 31 when a user of the mobile phone 1 sets the schedule via the schedule management interface 31. In one embodiment, the short messages stored in the storage device 12 are managed periodically according to the schedule. Referring to FIG. 3A, the schedule can be set as monthly, weekly, or daily, via the schedule management interface 31. If the schedule is set as weekly, for example, the mobile phone 1 automatically manages the short messages every week. The management of the short messages may include classifying the short messages, backing up the short messages and deleting the short messages. Referring to FIG. 3B, one of the management option can be selected via the item management interface 32 displayed on the display screen 13.

The weight assigning module 102 is operable to read a timestamp of a short message when the short message is received by the mobile phone 1. For example, if the mobile phone 1 receives a short message on Jun. 10, 2008, the weight assigning module 102 reads the timestamp of the short message as Jun. 10, 2008.

The weight assigning module 102 is further operable to assign a weight value to the short message according to an importance of the short message determined by the user. In one embodiment, the weight assigning module 102 can assign a first weight value or a second weight value to the short message according to the importance of the short message. The first weight value is analogous to a high importance level, and the second weight value is analogous to a low importance level. For example, if the short message is important, the weight assigning module 102 assigns the first weight value to the short message; otherwise, if the short message is unimportant, the weight assigning module 102 assigns the second weight value to the short message. Referring to FIG. 3C, the display screen 13 prompts the weight assigning interface 33 to display the weight value of each short message. For example, Message1 has the first weight value, Message2 has the first weight value, and Message3 has the second weight value.

The message classifying module 103 is operable to generate a message folder according to the timestamp of the short message, and classify the short message into the message folder. Referring to FIG. 3D, the message classifying module 103 generates a plurality of message folders, such as a "200806 folder," a "200807 folder," and a "200808 folder", and displays the plurality of message folders on the message classifying interface 34 of display screen 13. As mentioned above, if the timestamp of the short message is Jun. 10, 2008, the message classifying module 103 automatically classifies the short message into the "200806 folder".

The message processing module 104 is operable to check whether the short message has the first weight value or the second weight value according to the schedule. As mentioned above, if the schedule is set as weekly, the message processing module 104 automatically checks the weight value of the short message very week.

The message processing module 104 is further operable to automatically backup the short message to the storage device 12 if the short message has the first weight value, and automatically delete the short message from the message folder if the short message has the second weight value. Referring to FIG. 3E-3F, the display screen 13 prompts the message backup interface 35 and the message deleting interface 36 to manage different short messages. For example, since Message1 has the first weight value, the message processing module 104 automatically backups Message1 to the storage device 12 via the message backup interface 35. Since Message3 has the second weight value, the message processing module 104 automatically deletes Message3 from the message folder via the message deleting interface 36.

Figure 2:
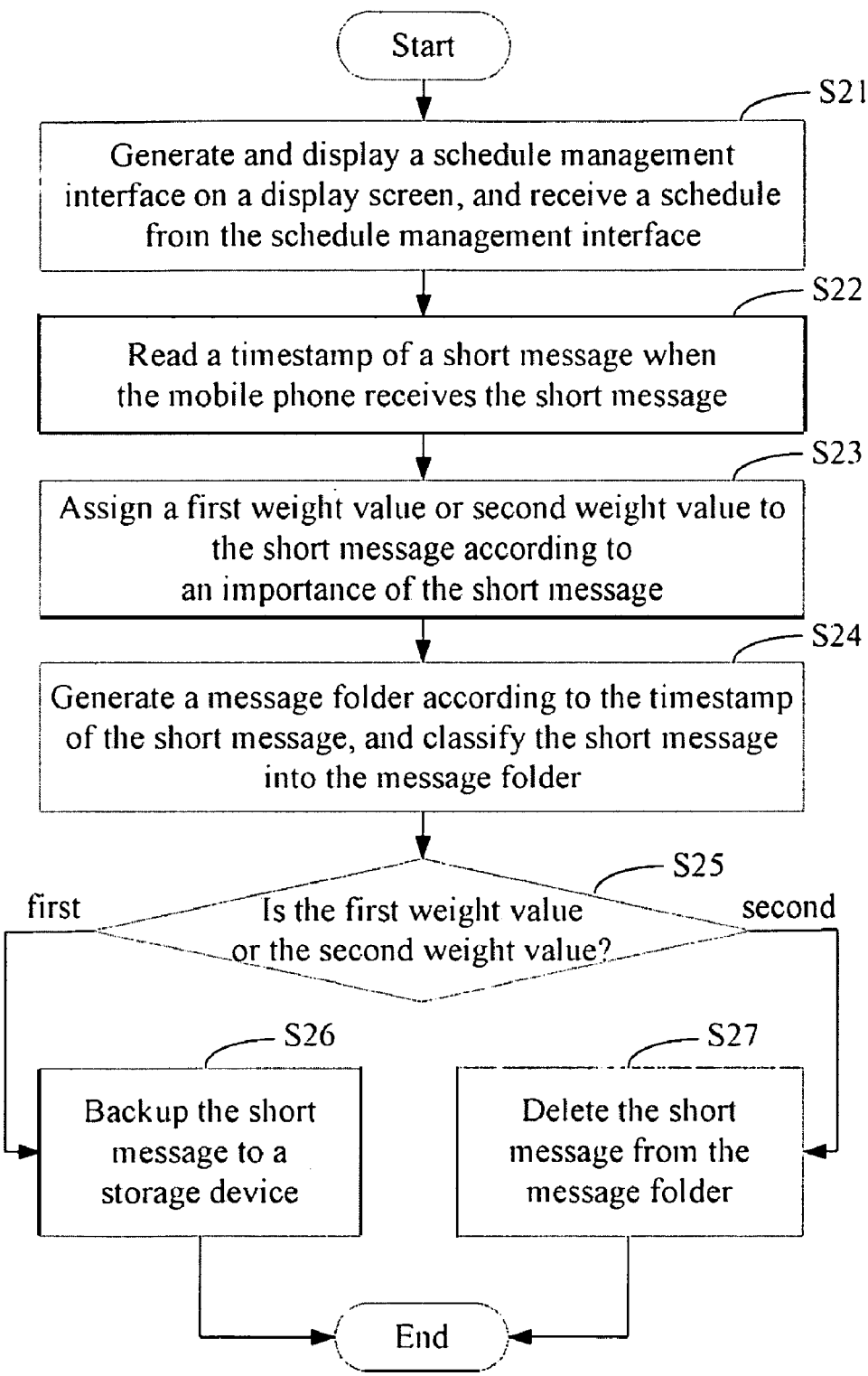
FIG. 2 is a flowchart of one embodiment of a method for managing short messages of the mobile phone of FIG. 1.

FIG. 2 is a flowchart of one embodiment of a method for managing short messages of a mobile phone by using the system 10 of FIG. 1 as described above. Depending on the embodiment, additional blocks may be added, others removed, and the ordering of the blocks may be changed.

In block S21, the schedule setting module 101 generates and displays a schedule management interface 31 on the display screen 13, and receives a schedule from the schedule management interface 31 when a user of the mobile phone 1 sets the schedule via the schedule management interface 31. In one embodiment, the short messages stored in the storage device 12 is managed periodically according to the schedule. Referring to FIG. 3A, if the schedule is set as weekly, the mobile phone 1 automatically manages (such as classify, backup or delete) the short messages every week. Referring to FIG. 3B, the managing option of the short message can be selected via the item management interface 32 displayed on the display screen 13.

In block S22, the weight assigning module 102 reads a timestamp of a short message when the short message is received by the mobile phone 1. As mentioned above, if the mobile phone 1 receives a short message on Jun. 10, 2008, the weigh assigning module 102 reads the timestamp of the short message as Jun. 10, 2008.

In block S23, the weight assigning module 102 assigns a weight value to the short message according to an importance of the short message determined by the user. Details of assigning a weight value to the short message is explained above. Referring to FIG. 3C, Message1 has the first weight value, Message2 has the first weight value, Message3 has the second weight value, and so on.

In block S24, the message classifying module 103 generates a message folder according to the timestamp of the short message, and automatically classifies the short message into the message folder. Referring to FIG. 3D, the message folder may be, but not limited to, a "200806 folder," a "200807 folder," a "200808 folder," and etc. As mentioned above, if the timestamp of the short message is Jun. 10, 2008, the message classifying module 103 automatically classifies the short message into the "200806 folder".

In block S25, the message processing module 104 checks whether short message has the first weight value or the second weight value according to the schedule. As mentioned above, if the schedule is set as weekly, the message processing module 104 automatically checks the weight value of the short message very week.

In block S26, if the short message has the first weight value, the message processing module 104 automatically backups the short message to the storage device 12. Otherwise, if the short message has the second weight value, in block S27, the message processing module 104 automatically deletes the short message from the message folder. Referring to FIG. 3E, the message processing module 104 automatically backups the Message1 to the storage device 12 since Message1 has the first weight value. Referring to FIG. 3F, the message processing module 104 automatically deletes Message3 from the message folder since Message3 has the second weight value.

All of the processes described above may be embodied in, and fully automated via, functional code modules executed by one or more general purpose processors of electronic devices. The functional code modules may include be stored in any type of non-transitory readable medium or other computerized storage devices known to one of ordinary skill, and one or more instructions of the functional code modules are stored in the readable medium or the computerized storage devices. Some or all of the methods may alternatively be embodied in specialized the electronic devices.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A mobile phone for managing short messages, the mobile phone comprising:
   a storage device operable to store short messages received by the mobile phone; and
   at least one processor operable to execute a message management system, the message management system comprising:
   a schedule setting module operable to generate and display a schedule management interface on a display screen of the mobile phone, and receive a schedule when a user of the mobile phone sets the schedule via the schedule management interface;
   a weight assigning module operable to read a timestamp of a short message when the short message is received, and assign a first weight value or a second weight value to the short message according to an importance of the short message determined by the user;
   a message classifying module operable to generate a message folder according to the timestamp of the short message, and classify the short message into the message folder; and
   a message processing module operable to check whether the short message has the first weight value or the second weight value according to the schedule, backup the short message to the storage device if the short message has the first weight value, and delete the short message from the message folder if the short message has the second weight value.

2. The mobile phone according to claim 1, wherein the display screen promotes a plurality of user interfaces when the message management system manages the short messages of the mobile phone.

3. The mobile phone according to claim 2, wherein the plurality of user interfaces comprise an item management interface, a weight assigning interface, a message classifying interface, a message backup interface, and a message deleting interface.

4. The mobile phone according to claim 1, wherein the weight assigning module assigns the first weight value to the short message if the short message is important.

5. The mobile phone according to claim 1, wherein the weight assigning module assigns the second weight value to the short message if the short message is unimportant.

6. The mobile phone according to claim 1, wherein the storage device is selected from the group consisting of a smart media card, a secure digital card, a compact flash card, a multi media card, and an extreme digital card.

7. A method for managing short messages of a mobile phone, the method comprising:
(a) generating and displaying a schedule management interface on a display screen of the mobile phone, and receiving a schedule when a user of the mobile phone sets the schedule via the schedule management interface;
(b) reading a timestamp of a short message when the short message is received;
(c) assigning a first weight value or a second weight value to the short message according to an importance of the short message determined by the user;
(d) generating a message folder according to the timestamp of the short message, and classifying the short message into the message folder;
(e) checking whether the short message has the first weight value or the second weight value according to the schedule; and
(f) backing up the short message to a storage device of the mobile phone if the short message has the first weight value, or deleting the short message from the message folder if the short message has the second weight value.

8. The method according to claim 7, wherein the display screen promotes a plurality of user interfaces during the process of managing the short messages of the mobile phone.

9. The method according to claim 8, wherein the plurality of user interfaces comprise an item management interface, a weight assigning interface, a message classifying interface, a message backup interface, and a message deleting interface.

10. The method according to claim 7, wherein the block (e) comprises:
assigning the first weight value to the short message if the short message is important; and
assigning the second weight value to the short message if the short message is unimportant.

11. The method according to claim 7, wherein the storage device is selected from the group consisting of a smart media card, a secure digital card, a compact flash card, a multi media card, and an extreme digital card.

12. A non-transitory readable medium having stored thereon instructions that, when executed by a processor of a mobile phone, cause the mobile phone to perform a method for managing short messages, the method comprising:
(a) generating and displaying a schedule management interface on a display screen of the mobile phone, and receiving a schedule when a user of the mobile phone sets the schedule via the schedule management interface;
(b) reading a timestamp of a short message when the short message is received;
(c) assigning a first weight value or a second weight value to the short message according to an importance of the short message determined by the user;
(d) generating a message folder according to the timestamp of the short message, and classifying the short message into the message folder;
(e) checking whether the short message has the first weight value or the second weight value according to the schedule; and
(f) backing up the short message to a storage device of the mobile phone if the short message has the first weight value, or deleting the short message from the message folder if the short message has the second weight value.

13. The non-transitory readable medium according to claim 12, wherein the display screen promotes a plurality of user interfaces during the process of managing the short messages of the mobile phone.

14. The non-transitory readable medium according to claim 13, wherein the plurality of user interfaces comprise an item management interface, a weight assigning interface, a message classifying interface, a message backup interface, and a message deleting interface.

15. The non-transitory readable medium according to claim 12, wherein the block (e) comprises:
assigning the first weight value to the short message if the short message is important; and
assigning the second weight value to the short message if the short message is unimportant.

16. The non-transitory readable medium according to claim 12, wherein the storage device is selected from the group consisting of a smart media card, a secure digital card, a compact flash card, a multi media card, and an extreme digital card.

* * * * *